United States Patent
Miyazaki et al.

(10) Patent No.: US 11,855,254 B2
(45) Date of Patent: Dec. 26, 2023

(54) SOLID ELECTROLYTE

(71) Applicants: NAGOYA INSTITUTE OF TECHNOLOGY, Nagoya (JP); NGK INSULATORS, LTD., Nagoya (JP)

(72) Inventors: Reona Miyazaki, Nagoya (JP); Toshihiro Yoshida, Nagoya (JP); Satoshi Ozaki, Nagoya (JP); Yosuke Sato, Nagoya (JP); Yuji Katsuda, Nagoya (JP)

(73) Assignees: Nagoya Institute of Technology, Nagoya (JP); NGK INSULATORS, LTD., Nagoya (JP)

( * ) Notice: Subject to any disclaimer, the term of this patent is extended or adjusted under 35 U.S.C. 154(b) by 840 days.

(21) Appl. No.: 16/923,808

(22) Filed: Jul. 8, 2020

(65) Prior Publication Data
US 2020/0343585 A1 Oct. 29, 2020

Related U.S. Application Data

(63) Continuation of application No. PCT/JP2019/004397, filed on Feb. 7, 2019.

(30) Foreign Application Priority Data

Feb. 9, 2018 (JP) ................... 2018-021906

(51) Int. Cl.
*H01M 10/0562* (2010.01)
*C01D 15/02* (2006.01)
*C01D 15/06* (2006.01)

(52) U.S. Cl.
CPC ........ *H01M 10/0562* (2013.01); *C01D 15/02* (2013.01); *C01D 15/06* (2013.01); *C01P 2006/10* (2013.01); *C01P 2006/40* (2013.01); *H01M 2300/0071* (2013.01)

(58) Field of Classification Search
None
See application file for complete search history.

(56) References Cited

FOREIGN PATENT DOCUMENTS

JP 2015-176854 A1 10/2015
JP 2017-224427 A1 12/2017

OTHER PUBLICATIONS

V. K. Deshpande, F. C. Raghuwanshi, K. Singh. Electrical Conductivity of the Li2SO4—LiOH System, Solid State Ionics 18 & 19 (1986), 378-381.*
V.K. Deshpande et al., "Electrical Conductivity of the Li2SO4—LiOH System," Solid State Ionics, 1986, vol. 18-19, pp. 378-381.
K. Singh et al., "Study of Zn/Li$_2$ $_{SO4:}$ $_{LiOH/V2O3}$:P$_2$O$_5$ Solid State Electrochemical Cells," Bulletin of Electrochemistry, 1996, vol. 12, No. 11-12, pp. 693-695.
International Search Report and Written Opinion (Application No. PCT/JP2019/004397) dated Apr. 9, 2019 (with English translation).
K. Singh, et al., "Li$_2$ $_{SO4}$:LiOH Eutectic System, A Promising Solid Electrolyte," Solid State Ionics, 28-30 (1988), pp. 267-270.
Chinese Office Action (Application No. 201980005795.6) dated Apr. 27, 2021 (with English translation).

* cited by examiner

*Primary Examiner* — Carlos Barcena
(74) *Attorney, Agent, or Firm* — BURR PATENT LAW, PLLC

(57) ABSTRACT

Provided is a solid electrolyte which contains a composition expressed by 3LiOH·Li$_2$SO$_4$. The solid electrolyte has a lithium ion conductivity of $0.1 \times 10^{-6}$ S/cm or more at 25° C. and an activation energy of 0.6 eV or more.

10 Claims, No Drawings

SOLID ELECTROLYTE

CROSS-REFERENCE TO RELATED APPLICATIONS

This application is a continuation application of PCT/JP2019/004397 filed Feb. 7, 2019, which claims priority to Japanese Patent Application No. 2018-021906 filed Feb. 9, 2018, the entire contents all of which are incorporated herein by reference.

BACKGROUND OF THE INVENTION

1. Field of the Invention

The present invention relates to a solid electrolyte.

2. Description of the Related Art

Solid electrolytes for use in electric storage devices, such as lithium ion secondary batteries and capacitors have been extensively studied in recent years. In particular, development of the solid electrolytes have been eagerly awaited that can have sufficient lithium ion conductivity over a wide temperature range from room temperature to high temperature.

Non-Patent Document 1 proposes use of a solidified material produced by homogenously melting and then quenching $Li_2SO_4$ and LiOH as a solid electrolyte. In particular, this solid electrolyte can be used in a device operable at low temperature.

CITATION LIST

Non-Patent Literature

Non-Patent Document 1: V. K. DESHPANDE, F. C. RAGHUWANSHI AND K. SINGH, ELECTRICAL CONDUCTIVITY OF THE $Li_2SO_4$—LiOH SYSTEM (Solid State Ionics 18 & 19 (1986)378-381)

SUMMARY OF THE INVENTION

Unfortunately, the solid electrolyte disclosed in Non-Patent Document 1 does not have sufficiently high lithium ion conductivity at room temperature. In addition, the lithium ion conductivity of the solid electrolyte in Non-Patent Document 1 is less temperature-dependent; hence, an increase in lithium ion conductivity with an increase in temperature cannot be expected. In other words, this solid electrolyte is not a material having sufficiently high lithium ion conductivity over a wide temperature range from room temperature to high temperature.

An object of the present invention is to provide a solid electrolyte that can have sufficiently high lithium ion conductivity over a wide temperature range from room temperature to high temperature.

According to an aspect of the present invention, there is provided a solid electrolyte comprising a composition expressed by a formula $3LiOH \cdot Li_2SO_4$, wherein the solid electrolyte has a lithium ion conductivity of $0.1 \times 10^{-6}$ S/cm or more at 25° C. and an activation energy of 0.6 eV or more.

According to another aspect of the present invention, there is provided a method of producing the solid electrolyte, comprising the steps of:

cooling a melt having a feedstock composition expressed by a formula $xLiOH \cdot yLi_2SO_4$ (where $x+y=1$ and $0.6 \leq x \leq 0.80$) to form a solidified material;

grinding or mechanically milling the solidified material to produce solid electrolyte powder; and shaping the solid electrolyte powder or melting and then cooling the solid electrolyte powder to form the solid electrolyte.

According to another aspect of the present invention, there is provided a method of producing the solid electrolyte, comprising the steps of:

mixing and grinding LiOH powder and $Li_2SO_4$ powder in a ratio making a feedstock composition expressed by a formula $xLiOH \cdot yLi_2SO_4$ (where $x+y=1$ and $0.6 \leq x \leq 0.80$) by mechanical milling to synthesize solid electrolyte powder; and shaping the solid electrolyte powder or melting and then cooling the solid electrolyte powder to form the solid electrolyte.

DETAILED DESCRIPTION OF THE INVENTION

Solid Electrolyte

A solid electrolyte of the present embodiment is used in electric storage devices, such as lithium ion secondary batteries and capacitors, and is suitable for, in particular, lithium ion secondary batteries. The lithium ion secondary battery may be an all-solid-state battery (for example, an all-solid-state lithium ion secondary battery). Alternatively, the lithium ion secondary battery may be a liquid battery (for example, a lithium-air battery) including a solid electrolyte used as a separator, a counter electrode, and an electrolytic solution contained between the separator and the counter electrode.

The solid electrolyte of the present embodiment comprises $3LiOH \cdot Li_2SO_4$. The solid electrolyte may comprise any composition other than $3LiOH \cdot Li_2SO_4$. Such a composition other than $3LiOH \cdot Li_2SO_4$ may comprise Li, O, H, and S or may be composed of only these elements. The solid electrolyte of the present embodiment is preferably composed of a single phase of $3LiOH \cdot Li_2SO_4$, which can be identified from an X-ray diffraction pattern in reference to 032-0598 in the ICDD database. In the present invention, $3LiOH \cdot Li_2SO_4$ refers to a composition that can be consider to have the same crystal structure as $3LiOH \cdot Li_2SO_4$ and need not necessarily have the same crystal composition as $3LiOH \cdot Li_2SO_4$. In other words, a composition of LiOH and $Li_2SO_4$ in a ratio other than 3:1 also falls within the solid electrolyte of the present invention as long as it has a crystal structure equivalent to that of $3LiOH \cdot Li_2SO_4$. The solid electrolyte of the present embodiment may contain incidental impurities in some cases.

The solid electrolyte of the present embodiment has a lithium ion conductivity of $0.1 \times 10^{-6}$ S/cm or more at 25° C. The performance of an electric storage device can be thereby improved at an initial atmospheric temperature (a temperature substantially equal to the room temperature) in use of the solid electrolyte.

The lithium ion conductivity of the solid electrolyte at 25° C. is preferably $0.2 \times 10^{-6}$ S/cm or more, more preferably $0.8 \times 10^{-6}$ S/cm or more, particularly preferably $1.0 \times 10^{-6}$ S/cm or more. A higher content of $3LiOH \cdot Li_2SO_4$ in the solid electrolyte can have increased lithium ion conductivity. The lithium ion conductivity can be readily adjusted by, for example, modification of parameters x and y in the formula of the feedstock composition for synthesis of the solid electrolyte: (1) $x\text{LiOH} \cdot y\text{Li}_2\text{SO}_4$. In detail, the lithium ion conductivity increases as the parameter x approximates 0.75. The lithium ion conductivity further increases as the parameter x approximates 0.72.

The solid electrolyte may also include any different phase in addition to the main phase of $3\text{LiOH} \cdot \text{Li}_2\text{SO}_4$. Examples of the different phase include LiOH and $\text{Li}_2\text{SO}_4$ originated from feedstocks. These different phases are residues of unreacted feedstocks during production of $3\text{LiOH} \cdot \text{Li}_2\text{SO}_4$. Since the different phase does not contribute to the lithium ion conductivity, the amount of the different phase is preferably as little as possible. In an X-ray diffraction pattern of the solid electrolyte observed with a radiation source of CuKα, the ratio B/A of the peak intensity B assigned to LiOH in the vicinity of $2\theta=20.5°$ to the peak intensity A assigned to $3\text{LiOH} \cdot \text{Li}_2\text{SO}_4$ in the vicinity of $2\theta=18.4°$ is preferably 0.30 or less, more preferably 0.20 or less.

The lithium ion conductivity of the solid electrolyte is determined as follows: A circularly stamped solid electrolyte is held between two stainless-steel (SUS) electrodes. The solid electrolyte between these electrodes is then placed in a cell (an HS cell available from Hohsen Corp.), resulting in an ion conductivity measuring cell. The ion conductivity measuring cell is placed in an isothermal bath at 25° C. to measure the conductance (1/r) by an AC impedance method. The lithium ion conductivity is calculated from the expression of lithium ion conductivity $\sigma=L/r$ (1/A), where r represents the resistance (Ω), L the distance between the electrodes (cm), A the area of the electrodes (cm$^2$), and L/A the cell constant (cm$^{-1}$).

The solid electrolyte of the present embodiment has an activation energy of 0.6 eV or more. The lithium ion conductivity of the solid electrolyte is controlled by the activation energy depending on the temperature. The correlation between the lithium ion conductivity and the temperature depends on the Arrhenius equation. At a high level of activation energy, the lithium ion conductivity increases as the temperature rises. Thus, a solid electrolyte having an activation energy of 0.6 eV or more in an electric storage device can be used to maintain sufficiently high lithium ion conductivity over a wide temperature range from room temperature to high temperature (for example, 150° C.).

The solid electrolyte has an activation energy of 0.6 eV or more, preferably 0.7 eV or more, more preferably 0.8 eV or more, particularly preferably 0.9 eV or more. The electric storage device can be thereby used at high temperature enhancing the lithium ion conductivity. The activation energy of the solid electrolyte can be adjusted by, for example, grinding and pressing of a solidified material (a solid electrolyte) that is produced by quenching a melt of $\text{Li}_2\text{SO}_4$ feedstock powder and LiOH feedstock powder. The activation energy of the solid electrolyte can also be adjusted by production of a solid electrolyte by melting and slow cooling of solid electrolyte powder.

The activation energy of the solid electrolyte is determined as follows: A circularly stamped solid electrolyte is held between two gold electrodes. The solid electrode between these electrodes is then placed in a cell (an HS cell available from Hohsen Corp.), resulting in an ion conductivity measuring cell. The ion conductivity measuring cell is placed in an isothermal bath. While the temperature is varied to 25° C., 50° C., 75° C., 100° C., 125° C., and then 150° C., the conductance (1/r) is measured at each temperature by an AC impedance method. The lithium ion conductivity at each temperature is calculated from the expression of lithium ion conductivity $\sigma=L/r$ (1/A). The lithium ion conductivities are plotted on a graph where the horizontal axis is 1/T (T represents the absolute temperature) and the vertical axis ln (σT) (σ represents the lithium ion conductivity and T the absolute temperature) to give a slope $-Ea/R$. An activation energy Ea is calculated from the expression $R=8.62\times10^{-5}$ eV/K.

As described above, the present invention can provide a solid electrolyte that can have sufficiently high lithium ion conductivity over a wide temperature range from room temperature to high temperature. The reason is presumed as follows: In Non-Patent Document 1, a quenched-solidified material is used as it is as a solid electrolyte. If a melt is quenched, a randomly melted structure is likely to be maintained in the solidified material. Thus, a traditional material disclosed in Non-Patent Document 1 probably contains a large amount of amorphous phases. Since a high stress is applied to the solidified material during a cooling process, cracking is likely to occur in the solidified material. In Non-Patent Document, some solid electrolytes that have lower lithium ion conductivities at room temperature than the material of the present invention cannot presumably have sufficient lithium ion conductivities due to impacts of cracking. In Non-Patent Document 1, some solid electrolytes that have low activation energies presumably have many amorphous moieties and cause active movement of lithium, which precludes improvement of lithium ion conductivity at high temperature. In contrast, the solid electrolyte of the present invention does not have such negative factors and thus have a high lithium ion conductivity and a high activation energy. For example, it is presumed that grinding of the solidified material synthesized by melting and quenching reduces cracks and amorphous phases in the solidified material while compaction of the solidified-ground material produces a solid electrolyte where particles of the solidified material come into good contact with each other. In addition, it is presumed that melting and slowly cooling of the solidified material after compaction produces a solid electrolyte that has reduced cracks and reduced amorphous phases, a high lithium ion conductivity at 25° C. and a high activation energy, and can have sufficiently high lithium ion conductivity over a wide temperature range from room temperature to high temperature.

The solid electrolyte of the present embodiment may have any bulk density, for example, 1.3 g/cc to 1.7 g/cc. In order to improve the lithium ion conductivity, the solid electrolyte preferably has a bulk density of 1.4 g/cc or more, more preferably 1.45 g/cc or more, particularly preferably 1.6 g/cc or more. The weight of the solid electrolyte and the volume calculated from the outer dimensions of the solid electrolyte can be used to determine the bulk density of the solid electrolyte from the weight/volume ratio.

The solid electrolyte of the present embodiment is preferably a green compact. The solid electrolyte of the present embodiment may be a melt-solidified material (solidified after hot melting). In this case, the solid electrolyte is preferably a melt-solidified material produced by slow cooling.

In a method of producing the solid electrolyte of the present embodiment, the feedstock composition during synthesis of the solid electrolyte is preferably adjusted according to Formula (1):

$x\text{LiOH} \cdot y\text{Li}_2\text{SO}_4$  Formula (1):

In Formula (1), $x+y=1$ and $0.6 \leq x \leq 0.80$.

In Formula (1), $0.7 \leq x \leq 0.80$ is preferred. The lithium ion conductivity can be thereby improved.

The solid electrolyte of the present embodiment can be used alone or in combination with another solid electrolyte composed of different elements.

In a preferred embodiment of the present invention, the solid electrolyte is manufactured by (a) heating a feedstock composition expressed by Formula (1) to form a melt and cooling the melt into a solidified material; (b) grinding or mechanically milling the solidified material to produce solid electrolyte powder; and (c) shaping the solid electrolyte powder or remelting, cooling, and then solidifying the solid electrolyte powder to form the solid electrolyte. Cooling the melt in Step (a) may involve either quenching or slow cooling (for example, cooling in a furnace) the melt. Mechanical milling in Step (b) can be carried out by placing balls, for example, zirconia balls and the solidified material of the solid electrolyte into a zirconia container to grind the solidified material with a known technique under known conditions. Shaping the solid electrolyte powder in Step (C) can be carried out by various techniques, for example, pressing, such as metallic mold pressing or rubber pressing, preferably by metallic mold pressing. Cooling the solid electrolyte powder after remelting the solid electrolyte powder in Step (c) is preferably carried out by slowly cooling the electrolyte. The rate of slow cooling is preferably 10 to 1000° C./h, more preferably 10 to 100° C./h.

In another preferred embodiment of the present invention, the solid electrolyte is produced by: (a) mixing and grinding LiOH powder and $Li_2SO_4$ powder in a ratio making the feedstock composition expressed by Formula (1) by mechanical milling to synthesize solid electrolyte powder; and (b) shaping the solid electrolyte powder or hot-melting and then cooling the solid electrolyte powder to form the solid electrolyte. Mechanical milling in Step (a) can be carried out by placing balls, for example, zirconia balls, the LiOH powder, and the $Li_2SO_4$ powder into a zirconia container to mix and grind the LiOH powder and the $Li_2SO_4$ powder by a known technique under known conditions. Mixing and grinding the LiOH powder and the $Li_2SO_4$ powder with the aid of the balls can accelerate the synthetic reaction of the solid electrolyte powder. Shaping the solid electrolyte powder in Step (b) can be carried out by various techniques, for example, pressing, such as metallic mold pressing or rubber pressing, preferably by metallic mold pressing. Cooling the solid electrolyte powder after melting the solid electrolyte powder in Step (b) is preferably carried out by slow cooling (for example, cooling in a furnace). The rate of slowly cooling the solid electrolyte powder after melting the solid electrolyte powder is preferably 10 to 1000° C./h, more preferably 10 to 100° C./h.

EXAMPLES

Examples of the solid electrolyte of the present invention will now be described, with the proviso that these examples should not be construed to limit the present invention.

Examples 1 to 6

(1) Providing Feedstock Powder $Li_2SO_4$ feedstock powder (a commercialized product with a purity of 99% or more) and LiOH feedstock powder (a commercialized product with a purity of 98% or more) were mixed in various molar ratios shown in Table 1. Each feedstock powder was handled in a glove box under an Ar atmosphere at a dew point of −50° C. or less. A due care was taken to prevent alteration of the powder, for example, moisture absorption.

(2) Synthesis by Melting and Quenching

The mixture was placed into a glass tube under an Ar atmosphere and hot-melted at 430° C. for two hours. The glass tube was placed in water for ten minutes. The melt was thereby quenched into a solidified material.

(3) Grinding in Mortar

The solidified material was ground in a mortar under an Ar atmosphere, resulting in solid electrolyte powder having a mean diameter D50 of 5 to 50 μm.

(4) Metallic Mold Pressing

The solid electrolyte powder was subjected to metallic mold pressing under different pressures shown in Table 1, resulting in solid electrolyte pellet. Solid electrolyte pellets according to Examples 1 to 8 each had dimensions of a diameter 1 of 10 mm and a thickness of 0.5 mm.

Example 7

A solid electrolyte was produced as in Example 2 except that synthesis by melting and slow cooling was carried out as follows instead of synthesis by melting and quenching in Step (2):

(Synthesis by Melting and Slow Cooling)

The mixture was placed in a crucible made of a high purity of alumina under an Ar atmosphere. The crucible was placed into a quartz tube, which was then sealed at its flange. The quartz tube was placed in a tubular furnace. Gaseous Ar was introduced from an inlet of the flange and discharged from an outlet of the flange while the mixed powder was stirred and heated at 430° C. for 20 minutes to produce a melt. Subsequently, the melt was slowly cooled in the tubular furnace at 100° C./h (in the furnace) into a solidified material.

Example 8

A solid electrolyte was produced as in Example 2 except that mechanical milling was carried out as follows instead of synthesis by melting and quenching in Step (2) and that grinding in the mortar in Step (3) was not carried out:

(Mechanical Milling)

The mixture of feedstocks was placed in a zirconia pot (45 ml) in the glove box under an argon atmosphere. Additional ten zirconia balls each having a diameter of 10 mm were placed in the pot, which was then completely sealed. The pot was mounted to a planetary ball mill. Mechanical milling was carried out at a rate of 400 revolutions per minute (rpm) for 50 hours, resulting in solid electrolyte powder.

Example 9

A solid electrolyte was produced as in Example 2 except that synthesis by melting and slow cooling was carried out as in Example 7 instead of synthesis by melting and quenching in Step (2) and that mechanical milling was carried out as in Example 8 instead of grinding in the mortar in Step (3).

Example 10

A solid electrolyte was produced as in Example 2 except that mechanical milling was carried out as in Example 8 instead of synthesis by melting and quenching in Step (2), that grinding in the mortar in Step (3) was not carried out, and that melting and slow cooling in the following step was carried out to form the solid electrolyte instead of metallic mold pressing in Step (4).

(Melting and Slow Cooling)

The solid electrolyte powder was subjected to metallic mold pressing under a pressure of 200 MPa in the glove box under an argon atmosphere to form solid electrolyte pellets each having a diameter of 10 mm. The solid electrolyte pellet was then held between two stainless-steel (SUS) electrodes each having dimensions of a diameter of 10 mm and a thickness of 0.5 mm. A weight (15 g) was placed on the stack which was then heated at 430° C. for 45 minutes. The solid electrolyte pellet was thereby melted. The melt was then slowly cooled at 100° C./h into a solidified material.

Example 11

A solid electrolyte was produced as in Example 1 except that synthesis by melting and slow cooling was carried out as in Example 7 instead of synthesis by melting and quenching in Step (2) and that melting and slow cooling was carried out as in Example 10 instead of metallic mold pressing in Step (4).

Examples 12 to 16

Each solid electrolyte was produced as in Example 11 except that the molar ratio of $Li_2SO_4$ and LiOH was varied to the values indicated in Table 1 in Step (1) Providing Feedstock Powder.

Example 17 (Comparative Example)

In Comparative Example 1, a solidified material was produced by the same process involving melting and quenching as that in Example 2. The solidified material was used as it was as a solid electrolyte. The solid electrolyte of Comparative Example 1 had dimensions of a diameter Φ of 10 mm and a thickness of 0.5 mm.

Example 18 (Comparative Example)

In Comparative Example 2, a solidified material was produced by the same process involving melting and quenching as that in Example 3. The solidified material was used as it was as a solid electrolyte. The solid electrolyte of Comparative Example 2 had dimensions of a diameter φ of 10 mm and a thickness of 0.5 mm.

Example 19 (Comparative Example)

A solid electrolyte was produced as in Example 11 except that the molar ratio of $Li_2SO_4$ and LiOH was varied to the value indicated in Table 1 in Step (1) Providing Feedstock Powder.

In Examples 1 to 19, the rate of decrease in the total weight of the feedstocks is significantly low and only 1% or less in the steps of melting or mechanically milling feedstocks of LiOH and $Li_2SO_4$ to synthesize the solid electrolyte and remelting the solid electrolyte powder. Thus, it is presumed that the composition of Li, O, H, and S that constitute the solid electrolyte remains substantially unchanged after preparation of the feedstocks.

Measurement of Lithium Ion Conductivity and Activation Energy

The lithium ion conductivity and the activation energy of each of Examples 1 to 19 was determined by the following common AC impedance measurement:

A solid electrolyte was held between two stainless-steel (SUS) electrodes under an Ar atmosphere and was placed in a cell (an HS cell available from Hohsen Corp.) to produce an ion conductivity measuring cell.

The ion conductivity measuring cell was placed in an isothermal bath at 25° C. to measure the conductance (1/r) by an AC impedance method (with an AC impedance analyzer VMP3 available from BioLogic).

The lithium ion conductivity was calculated from the expression of lithium ion conductivity σ=L/r (1/A). Table 1 shows the results of calculation.

While the temperature of the isothermal bath containing the ion conductivity measuring cell was varied to 25° C., 50° C., 75° C., 100° C., 125° C., and then 150° C., the conductance (1/r) was measured at each temperature by the AC impedance method (with the AC impedance analyzer VMP3 available from BioLogic).

The lithium ion conductivity at each temperature was calculated from the expression of lithium ion conductivity σ=L/r (1/A) and was plotted on a graph where the horizontal axis was 1/T and the vertical axis ln (σT). The slope −Ea/R of an approximate straight-line was determined by least squares. The expression $R=8.62\times10^{-5}$ eV/K was used to calculate the activation energy (Ea). Table 1 shows the results of calculation.

Measurement of Bulk Density

The weight of the solid electrolyte of each of Examples 1 to 19 and the volume calculated from the outer dimensions of the solid electrolyte were used to determine the bulk density of the solid electrolyte from the weight/volume ratio. Table 1 shows the results of calculation.

Detection of $3LiOH \cdot Li_2SO_4$

Regarding each of Examples 1 to 19, the X-ray diffraction pattern of the solid electrolyte as ground before metallic mold pressing or the solid electrolyte of the melt-solidified material was observed by X-ray diffractometry (XRD, with an X-ray source of CuKα) and was compared with 032-0598 in the ICDD database to determine whether $3LiOH \cdot Li_2SO_4$ was contained. Table 1 shows the results of determination.

Ratio of XRD Peak Intensity of LiOH to XRD Peak Intensity of $3LiOH \cdot Li_2SO_4$ Based on each of the observed X-ray diffraction patterns, the ratio B/A of the XRD peak intensity B of LiOH to the XRD peak intensity A of $3LiOH \cdot Li_2SO_4$ was determined from the following peak intensities:

Diffraction peak intensity A assigned to $3LiOH \cdot Li_2SO_4$ in the vicinity of 2θ=18.44° in X-ray diffractometry Diffraction peak intensity B assigned to LiOH in the vicinity of 2θ=20.48° in X-ray diffractometry

TABLE 1

| | Composition of $x$LiOH•$y$Li$_2$SO$_4$ (molar ratio) | | | | | Bulk density of solid electrolyte | Detection of 3LiOH•Li$_2$SO$_4$ | LiOH/ 3LiOH•Li$_2$SO$_4$ XRD peak intensity ratio | Lithium ion conductivity at 25° C. | Activation energy |
|---|---|---|---|---|---|---|---|---|---|---|
| | x | y | Synthesis | Grinding | Final process | (g/cc) | by XRD | B/A | (S/cm) | (eV) |
| Ex. 1 | 0.7 | 0.3 | Melting and quenching | Grinding in mortar | Metallic mold pressing under 750 MPa | 1.6 | Detected | — | 1.1 × 10$^{-6}$ | 0.8 |
| Ex. 2 | 0.75 | 0.25 | Melting and quenching | Grinding in mortar | Metallic mold pressing under 750 MPa | 1.58 | Detected | 0.07 | 1.2 × 10$^{-6}$ | 0.81 |
| Ex. 3 | 0.8 | 0.2 | Melting and quenching | Grinding in mortar | Metallic mold pressing under 750 MPa | 1.55 | Detected | 0.16 | 1.0 × 10$^{-6}$ | 0.78 |
| Ex. 4 | 0.6 | 0.4 | Melting and quenching | Grinding in mortar | Metallic mold pressing under 750 MPa | 1.7 | Detected | — | 0.8 × 10$^{-6}$ | 0.65 |
| Ex. 5 | 0.6 | 0.4 | Melting and quenching | Grinding in mortar | Metallic mold pressing under 150 MPa | 1.4 | Detected | — | 0.2 × 10$^{-6}$ | 0.62 |
| Ex. 6 | 0.6 | 0.4 | Melting and quenching | Grinding in mortar | Metallic mold pressing under 100 MPa | 1.35 | Detected | — | 0.1 × 10$^{-6}$ | 0.6 |
| Ex. 7 | 0.75 | 0.25 | Melting and slow cooling | Grinding in mortar | Metallic mold pressing under 750 MPa | 1.57 | Detected | — | 1.2 × 10$^{-6}$ | 0.81 |
| Ex. 8 | 0.75 | 0.25 | Mechanical milling | N/A | Metallic mold pressing under 750 MPa | 1.59 | Detected | — | 1.2 × 10$^{-6}$ | 0.83 |
| Ex. 9 | 0.75 | 0.25 | Melting and slow cooling | Mechanical milling | Metallic mold pressing under 750 MPa | 1.60 | Detected | — | 1.2 × 10$^{-6}$ | 0.83 |
| Ex. 10 | 0.75 | 0.25 | Mechanical milling | N/A | Melting and slow cooling | 1.72 | Detected | — | 1.4 × 10$^{-6}$ | 0.75 |
| Ex. 11 | 0.70 | 0.30 | Melting and slow cooling | Grinding in mortar | Melting and slow cooling | 1.81 | Detected | 0.02 | 1.3 × 10$^{-6}$ | 0.65 |
| Ex. 12 | 0.71 | 0.29 | Melting and slow cooling | Grinding in mortar | Melting and slow cooling | 1.80 | Detected | 0.03 | 1.4 × 10$^{-6}$ | 0.67 |
| Ex. 13 | 0.72 | 0.28 | Melting and slow cooling | Grinding in mortar | Melting and slow cooling | 1.78 | Detected | 0.05 | 2.1 × 10$^{-6}$ | 0.70 |
| Ex. 14 | 0.74 | 0.26 | Melting and slow cooling | Grinding in mortar | Melting and slow cooling | 1.75 | Detected | 0.08 | 1.8 × 10$^{-6}$ | 0.71 |
| Ex. 15 | 0.75 | 0.25 | Melting and slow cooling | Grinding in mortar | Melting and slow cooling | 1.72 | Detected | 0.10 | 1.5 × 10$^{-6}$ | 0.74 |
| Ex. 16 | 0.8 | 0.2 | Melting and slow cooling | Grinding in mortar | Melting and slow cooling | 1.69 | Detected | 0.29 | 1.1 × 10$^{-6}$ | 0.73 |
| Ex. 17* | 0.75 | 0.25 | Melting and quenching | — | — | 1.6 | Detected | — | Not measurable due to high resistance | 1 |
| Ex. 18* | 0.8 | 0.2 | Melting and quenching | — | — | 1.6 | Detected | — | 2.0 × 10$^{-6}$ | 0.4 |
| Ex. 19* | 0.9 | 0.1 | Melting and slow cooling | Grinding in mortar | Melting and slow cooling | 1.60 | Detected | 3.03 | 0.06 × 10$^{-6}$ | 0.7 |

*indicates Comparative Example.

Table 1 demonstrates that Examples 1 to 16 can each have both a lithium ion conductivity of 0.1×10$^{-6}$ S/cm or more at 25° C. and an activation energy of 0.6 eV or more.

Table 1 demonstrates that Examples 1 to 3 at 0.7≤x≤0.8 in the formula $x$LiOH·$y$Li$_2$SO$_4$ can have higher lithium ion conductivities at 25° C. and more enhanced activation energies than Example 4 produced by the same process at x=0.6.

Table 1 demonstrates that Examples 1 to 5 and 7 to 16 where the solid electrolytes each have a bulk density of 1.4 g/cc or more can have more enhanced lithium ion conductivities at 25° C. than Example 6 where the solid electrolyte has a bulk density of 1.35 g/cc. It is also confirmed that the bulk density of the solid electrolyte can be readily adjusted by modification of the pressure for metallic mold pressing.

In comparison among those having the same composition, Examples 10, 11, 15, and 16 where the solid electrolytes are formed by melting and slow cooling can have enhanced lithium ion conductivities at 25° C. than Examples 1 to 3 where the solid electrolyte powder is pressed. In Examples 10, 11, 15, and 16, synthesis by melting and slow cooling presumably reduces cracks in the solidified materials and enhances the bulk densities to reduce pores in the solidified material, thereby enhancing the lithium ion conductivities.

Table 1 also shows the ratio B/A of the X-ray diffraction peak intensity B assigned to LiOH in the vicinity of 2θ=20.5° to the X-ray diffraction peak intensity A assigned to 3LiOH·Li$_2$SO$_4$ in the vicinity of 2θ=18.4° in an X-ray diffraction pattern of each solid electrolyte observed with a radiation source of CuKα. Table 1 demonstrates that Examples 2, 3, and 11 to 16 each having a ratio B/A of 0.30 or less have higher lithium ion conductivities at 25° C. than Example 19 (Comparative Example) having a ratio B/A of 0.30 or more and that a higher content of $3LiOH \cdot Li_2SO_4$ can enhance the lithium ion conductivity at 25° C.

What is claimed is:

1. A solid electrolyte comprising a composition expressed by a formula $3LiOH \cdot Li_2SO_4$, wherein the solid electrolyte has a lithium ion conductivity of $0.1 \times 10^{-6}$ S/cm or more at 25° C. and an activation energy of 0.6 eV or more.

2. The solid electrolyte according to claim 1, wherein the solid electrolyte has a bulk density of 1.4 g/cc or more.

3. The solid electrolyte according to claim 1, wherein the solid electrolyte is a melt-solidified material.

4. The solid electrolyte according to claim 1, wherein the ratio B/A of a peak intensity B assigned to LiOH in the vicinity of $2\theta=20.5°$ to a peak intensity A assigned to $3LiOH \cdot Li_2SO_4$ in the vicinity of $2\theta=18.4°$ is 0.30 or less in an X-ray diffraction pattern of the solid electrolyte observed with a radiation source of CuKα.

5. A method of producing the solid electrolyte according to claim 1, comprising the steps of:

cooling a melt having a feedstock composition expressed by a formula $xLiOH \cdot yLi_2SO_4$ (where x+y=1 and $0.6 \leq x \leq 0.80$) to form a solidified material;

grinding or mechanically milling the solidified material to produce solid electrolyte powder; and shaping the solid electrolyte powder or melting and then cooling the solid electrolyte powder to form the solid electrolyte.

6. The method according to claim 5, wherein the feedstock composition of the melt satisfies $0.7 \leq x \leq 0.80$.

7. The method according to claim 5, wherein the cooling after melting the solid electrolyte powder is carried out through slow cooling.

8. A method of producing the solid electrolyte according to claim 1, comprising the steps of:

mixing and grinding LiOH powder and $Li_2SO_4$ powder in a ratio making a feedstock composition expressed by a formula $xLiOH \cdot yLi_2SO_4$ (where x+y=1 and $0.6 \leq x \leq 0.80$) by mechanical milling to synthesize solid electrolyte powder; and shaping the solid electrolyte powder or melting and then cooling the solid electrolyte powder to form the solid electrolyte.

9. The method according to claim 8, wherein the feedstock composition satisfies $0.7 \leq x \leq 0.80$.

10. The method according to claim 8, wherein the cooling after melting the solid electrolyte powder is carried out through slow cooling.

* * * * *